(12) United States Patent
Lahr et al.

(10) Patent No.: US 6,933,700 B2
(45) Date of Patent: Aug. 23, 2005

(54) POSITIONING DEVICE

(75) Inventors: Johann Lahr, Traunwalchen (DE); Volker Höfer, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 250 days.

(21) Appl. No.: 10/457,074

(22) Filed: Jun. 6, 2003

(65) Prior Publication Data
US 2004/0012366 A1 Jan. 22, 2004

(30) Foreign Application Priority Data
Jun. 11, 2002  (DE) ......................................... 102 25 990

(51) Int. Cl.[7] ................................................. G05B 1/06
(52) U.S. Cl. ...................................... 318/640; 318/560
(58) Field of Search ................................ 318/640, 560; 324/174; 148/423

(56) References Cited

U.S. PATENT DOCUMENTS

| | | |
|---|---|---|
| 5,796,542 A | 8/1998 | Szeremeta |
| 2002/0088508 A1 * | 7/2002 | Holzil et al. ................. 148/423 |
| 2003/0052667 A1 * | 3/2003 | Schwabe ..................... 324/174 |

FOREIGN PATENT DOCUMENTS

| | | |
|---|---|---|
| EP | 0 978 708 A1 | 2/2000 |
| JP | 2000217311 A | 8/2000 |

OTHER PUBLICATIONS

Patent Abstracts of Japan publication regarding Japanese Publication 2000217311 A, published Aug. 4, published by Japanese Patent Office, 2000, one page.
Uematsu, Y. et al., "Servo Track Writing Technology," Fujitsu Sci. Tech. J., vol. 37, No. 2, Dec. 2001, pp. 220–226.

* cited by examiner

*Primary Examiner*—Karen Masih
(74) *Attorney, Agent, or Firm*—Brinks Hofer Gilson & Lione

(57) ABSTRACT

A positioning device that includes a pivotable shaft and a pivot drive mechanism, which has a stator and a rotor that moves relative to the stator. A position measuring arrangement includes a first element and a second element that moves in relation to the first element, wherein the rotor and the first element are connected, fixed against relative rotation, with the shaft. The positioning device further includes a bearing unit, wherein, starting at one end of the shaft, first the first element, then the bearing unit, and thereafter the rotor are arranged along the shaft.

17 Claims, 1 Drawing Sheet

POSITIONING DEVICE

Applicants claim, under 35 U.S.C. §119, the benefit of priority of the filing date of Jun. 11, 2002 of a German patent application, copy attached, Serial Number 102 25 990.9, filed on the aforementioned date, the entire contents of which is incorporated herein by reference.

BACKGROUND OF THE INVENTION

1. Field of the Invention

The present invention relates to a positioning device, having a pivotable shaft, to whose one end an element to be positioned can be attached, a pivot drive mechanism, a position measuring arrangement and a bearing unit, which is in particular suitable for the precise movement of a pivot arm for a servo track writer.

2. Discussion of Related Art

Such positioning devices are often employed in connection with servo track writers (STW), as mentioned above, where traces or tracks for magnetizable hard disks are installed, or written. To this end, a shaft in the STW, on which a pivot arm is fastened, is pivoted by a positioning device. A writing head is provided at the end of the pivot arm, which in the end is moved by a pivot movement of the shaft and is positioned in a highly precise manner, so that as many tracks as possible per surface unit of the hard disk can be configured. The number of tracks which are provided per surface unit or diameter unit (tracks per inch) is a measure for the storage capacity of the hard disks. For this reason continuous efforts are being made for achieving the tightest possible track formatting. An exact positioning of the pivot arms of the STW must be possible in a very short time (seek and settle time) so that the configuration of hard disks with tight track formatting can be economically provided by the producer of the hard disk.

Positioning devices are known form the publication "Servo Track Writing Technology" (Fujitsu Sci. Tech. J., 37.2, pp. 220 to 226) of December 2001, wherein the position of the pivot arm is scanned by a separate scanning unit. In this case the outlay for a relative positioning of the scanning unit in relation to the mechanical system of the pivot arm is not inconsiderable.

Further than that, positioning devices are also known, in which the scanning unit, or the entire position measuring device for measuring the angular position of the shaft to be pivoted, is placed inside a housing. So that rigid seating can be achieved, rolling bearing units are arranged at the greatest possible distance in the housing of the positioning devices of this type of construction, so that the position measuring device and the drive mechanism for moving the shaft are located between two rolling bearing units.

The known positioning devices have the disadvantage of either being constructed comparatively elaborately and not compact, and/or cannot be further improved regarding the accuracy and the seek and settle time.

Further than that, positioning devices are also known, in which the scanning unit, or the entire position measuring device for measuring the angular position of the shaft to be pivoted, is placed inside a housing. So that rigid seating can be achieved, rolling bearing units are arranged at the greatest possible distance in the housing of the positioning devices of this type of construction, so that the position measuring device and the drive mechanism for moving the shaft are located between two rolling bearing units.

The known positioning devices have the disadvantage of either being constructed comparatively elaborately and not compact, and/or cannot be further improved regarding the accuracy and the seek and settle time.

Further than that, positioning devices are also known, in which the scanning unit, or the entire position measuring device for measuring the angular position of the shaft to be pivoted, is placed inside a housing. So that rigid seating can be achieved, rolling bearing units are arranged at the greatest possible distance in the housing of the positioning devices of this type of construction, so that the position measuring device and the drive mechanism for moving the shaft are located between two rolling bearing units.

The known positioning devices have the disadvantage of either being constructed comparatively elaborately and not compact, and/or cannot be further improved regarding the accuracy and the seek and settle time.

OBJECT AND SUMMARY OF THE INVENTION

Therefore an object of the present invention is based on creating a positioning device of a compact structure which allows exceptionally exact positioning, as well as very short seek and settle times.

In accordance with the present invention, this object is attained by producing a positioning device that includes a pivotable shaft and a pivot drive mechanism, which has a stator and a rotor that moves relative to the stator. A position measuring arrangement includes a first element and a second element that moves in relation to the first element, wherein the rotor and the first element are connected, fixed against relative rotation, with the shaft. The positioning device further includes a bearing unit, wherein, starting at one end of the shaft, first the first element, then the bearing unit, and thereafter the rotor are arranged along the shaft.

In accordance therewith, the sequence in which, starting at the shaft end to which the pivot arm can be connected, the pivot drive mechanism, the bearing unit, and the position measuring arrangement are arranged along the shaft, is important for good functioning of the positioning device.

The positioning device of the present invention has the advantage that it allows a simple and economical construction and accurate and rapid positioning.

It has now been discovered that the inaccuracies in positioning a pivot arm at a pivotable shaft are caused to a considerable extent by the arrangement of the rolling bearings at the shaft between the position measuring arrangement and the pivot arm, or the shaft end to which the pivot arm is attached. The entire behavior of the positioning device in regard to positioning accuracy and seek and settle time is surprisingly improved, if a central bearing unit is arranged approximately in the center of the shaft. Supposed losses in regard to rigidity and insensitivity to vibrations by the system are therefore only of subordinate importance in the total behavior of the positioning device. It is therefore not necessary to provide a rolling bearing between the position measuring arrangement and the shaft end to which the pivot arm can be attached, so that practically no frictional forces occur there, which might cause a torsion-related deformation of the shaft.

The rigidity of the bearing can be further increased if a bearing unit including two rolling bearings is employed, which are installed in accordance with an O-arrangement and are advantageously prestressed.

In a preferred embodiment, the positioning device has a housing into which all components of the positioning device are placed, wherein the shaft end on which a pivot arm can be fastened, extends out of the housing. The opening for the shaft in the housing is advantageously provided with a seal, so that dirt cannot enter into the housing. Practically no frictional forces occur between the seal and the shaft, because a minimal air gap here allows a contactless operation, so that no torsion-related deformations of the shaft can be generated in this type of construction.

The novel arrangement of the appropriate components is preferably combined with a highly accurate position measuring arrangement in order to bring the advantages of the mechanical structure fully to bear. Therefore photoelectric scanning in accordance with the interferential measuring principle is employed in a preferred embodiment of the present invention.

Further advantages of the present invention will become apparent from the following description of an exemplary embodiment by the attached drawing.

DETAILED DESCRIPTION OF THE PREFERRED EMBODIMENTS

Figure 1:
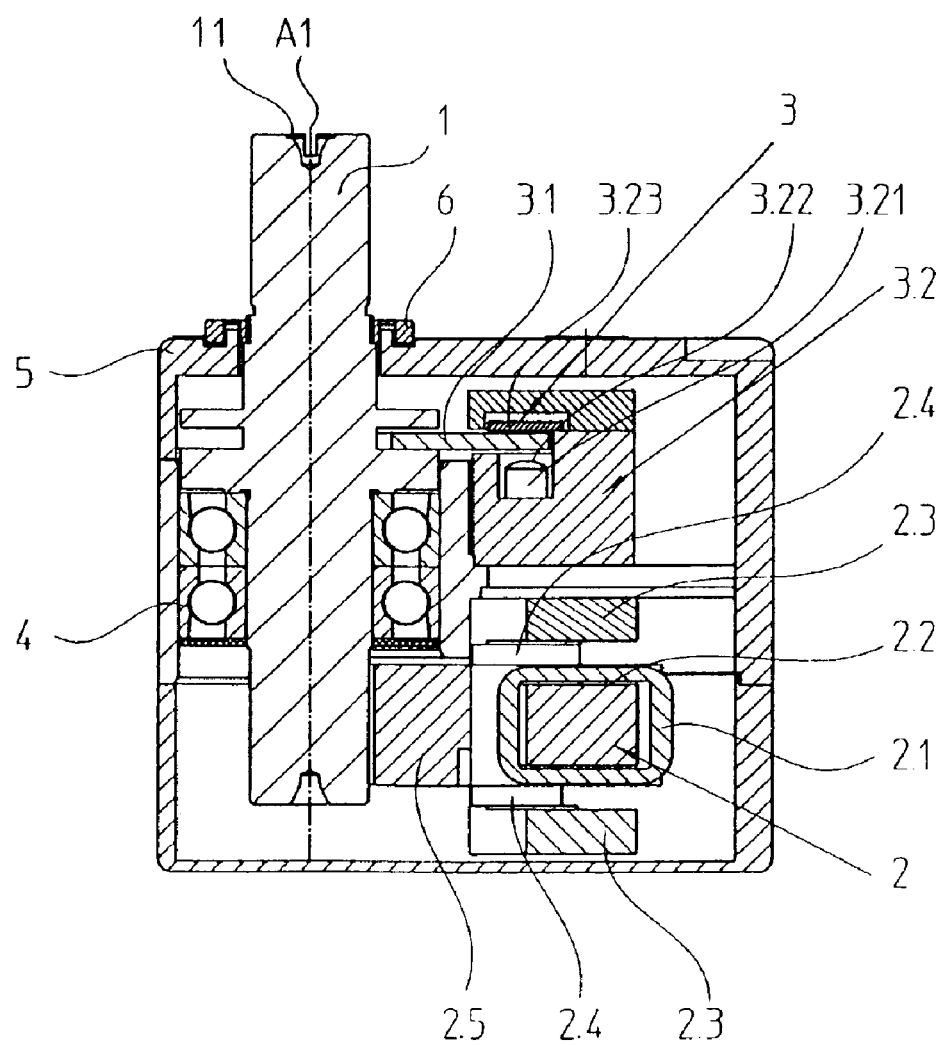
FIG. 1 is a sectional representation of an embodiment of a positioning device in accordance with the present invention.

A positioning device, such as is used in connection with STMs, is represented in FIG. 1. The shaft 1 can be pivoted around the axis A1 and has a shaft end 1.1, on which a pivot arm, not represented in FIG. 1, for writing on a hard disk can be fastened.

The pivot movement, a pivot range of ±25° is possible in the exemplary embodiment, is initiated by a so-called voice coil motor 2, an electrical direct drive. The primary element 2.1 of the voice coil motor 2, which in the example shown operates as a rotor within the pivot range, includes a copper coil 2.1, which encloses a ferromagnetic core 2.2. The ferromagnetic core 2.2 extends along a graduated arc-like shaped line corresponding to the pivot range. In this case the windings of the copper coil 2.1 are embodied in such a way that they come to rest parallel with the drawing plane in FIG. 1. In the course of operating the voice coil motor 2, the ferromagnetic core 2.2 remains stationary, while the copper coil 2.1 performs a pivot movement along the graduated arc-like shaped line. An adapter 2.5 is fastened to the copper coil 2.1 and is connected, fixed against relative rotation, with the shaft 1. The torque from the voice coil motor 2 for the pivot movement is introduced into the shaft 1 in this way. Therefore the copper coil 2.1 and the adapter 2.5 can be assigned to the primary element, or the rotor of the voice coil motor 2.

The secondary element includes permanent magnets 2.4, which are fastened to magnet supports 2.3 of a ferromagnetic material along the graduated arc-like shaped line. During the operation of the positioning device, the secondary element acts like a torque support and does not participate in the pivot movement of the shaft 1, in the exemplary embodiment represented it can therefore be called a stator.

The pivot angle of the shaft 1 is measured by a position measuring arrangement 3, which operates in accordance with a functional principle similar to the one described in the Published, Non-Examined Patent Application EP 0 978 708 A1 of Applicant. Accordingly, the position measuring arrangement 3 includes a transparent phase grating 3.1, which has the shape of a segment of an annular disk, so that the entire pivot range can be scanned. In this case the transparent phase grating 3.1 is connected, fixed against relative rotation, with the shaft 1, so that it participates in the pivot movements of the shaft 1.

The non-rotatable scanning unit 3.2 of the position measuring arrangement 3 is located opposite the transparent phase grating 3.1. The scanning unit 3.2 includes an LED 3.21, a condenser lens 3.22 and a scale segment 3.23, as well as photo-detectors (not represented in FIG. 1) for receiving the modulated light beams. The scale segment 3.23 is embodied as a reflection phase grating, or stepped grating. This means that reflecting lines, in the example shown of a height of 0.2 µm, have been applied to a reflecting surface. Because the scale segment 3.23 does not participate in the pivot movement and therefore is always located opposite the LED 3.21, it can be designed to be small in comparison with the pivotable phase grating 3.1.

In the course of the operation of the positioning device, the light generated by the LED 3.21 initially passes through the condenser lens 3.22 and thereafter through the transparent phase grating 3.1, which generates diffracted beam elements and causes a phase change of the lightwaves. The light beams changed in this way then reach the scale segment 3.23 in the form of the reflection phase grating. They are again diffracted there, and a further phase change of the lightwaves occurs. The reflected and diffracted light beams are then again passed through the transparent phase grating 3.1 and are again diffracted and cause interference. The light beams modulated in this way then impinge on photodetectors located in the area of the LED 3.21 and cannot be seen in the sectional representation in FIG. 1. The photodetectors convert the light signals into electrical signals, which are thereafter appropriately further processed for obtaining the position information.

The use of the comparatively small scale segment 3.23 as a non-rotating component has the particular advantage that it is not necessary to select the tolerances regarding the wobble of the scale segment 3.23 as narrowly as would be the case wherein the scale segment 3.23 would rotate during operation.

When using such a high-resolution interferential position measuring arrangement 3 in particular, the optimized geometrical arrangement of the mechanically operating components has a special advantage for achieving the highest possible increase in accuracy and speed of the position measuring arrangement as a whole.

The bearing unit 4 is located on the shaft 1 between the voice coil motor 2 and the position measuring arrangement 3, and includes two ball bearings, which are prestressed and installed in an O-arrangement. Ball bearings with ceramic balls and a fabric ball cage are employed in the exemplary embodiment represented. It is therefore possible by this arrangement, or sequence, of the components, that frictional forces, emanating from the bearing unit 4, cannot cause torsion in the shaft 1 in the area between the transparent phase grating 3.1 (and therefore the positioning arrangement 3) and the shaft end 1.1. In spite of this, the represented bearing unit 4 is so rigid that the vibration susceptibility of the entire system is low, so that very accurate and rapid positioning processes are possible.

The major part of the shaft 1, the voice coil motor 2, the position measuring arrangement 3 and the bearing unit 4, are located inside a housing 5. In this way a unit is produced which is compact and self-contained, and which, by reason of constructive conditions and the exact installation of the components, can operate precisely without further adjusting steps.

A seal 6 has been placed in the opening in the housing 5 for the shaft 1. The seal 6 practically generates no frictional forces during the pivot movements of the shaft 1, so that the positioning is not affected at this place.

The present invention also includes a way of constructing a positioning arrangement, wherein a further bearing unit is arranged in the area of the shaft end located opposite the shaft end 1.1 to which the pivot arm is fastened, so that the adapter 2.5 is located between the bearing unit 4 and the additional bearing.

Further exemplary embodiments exist within the scope of the present invention besides the described examples.

We claim:

1. A positioning device, comprising
   a pivotable shaft;
   a pivot drive mechanism comprising:
   a stator; and
   a rotor that moves relative to said stator;
   a position measuring arrangement comprising:
   a first element; and
   a second element that moves in relation to said first element, wherein said rotor and said first element are connected, fixed against relative rotation, with said shaft; and
   a bearing unit; and
   wherein, starting at one end of said shaft, first said first element, then said bearing unit, and thereafter said rotor are arranged along said shaft.

2. The positioning device in accordance with claim 1, wherein said pivot drive mechanism, said position measuring arrangement and said bearing unit are arranged inside a housing.

3. The positioning device in accordance with claim 2, wherein said shaft passes through said housing; and
   a seal is arranged where said shaft passes through said housing.

4. The positioning device in accordance with claim 1, wherein said pivot drive mechanism is an electrical drive.

5. The positioning device in accordance with claim 4, wherein said electrical drive comprises a synchronous direct drive mechanism.

6. The positioning device in accordance with claim 1, wherein said position measuring arrangement operates via photoelectric scanning.

7. The positioning device in accordance with claim 6, wherein said position measuring arrangement operates via an interferential measuring principle.

8. The positioning device in accordance with claim 6, wherein said first element comprises a transparent phase grating, and said second element comprises a reflection phase grating.

9. The positioning device in accordance with claim 7, wherein said first element comprises a transparent phase grating, and said second element comprises a reflection phase grating.

10. The positioning device in accordance with claim 6, wherein said first element comprises a reflection phase grating, and said second element comprises a transparent phase grating.

11. The positioning device in accordance with claim 7, wherein said first element comprises a reflection phase grating, and said second element comprises a transparent phase grating.

12. The positioning device in accordance with claim 1, wherein said bearing unit comprises rolling bearing.

13. The positioning device in accordance with claim 12, further comprising a second rolling bearing, wherein said rolling bearing and said second rolling bearing are installed in an O-arrangement.

14. The positioning device in accordance with claim 1, further comprising a third element attached to said shaft.

15. The positioning device in accordance with claim 14, wherein said third element comprises a writing head that forms a track on a hard disk.

16. The positioning device in accordance with claim 1, further comprising a third element attached to said one end of said shaft.

17. The positioning device in accordance with claim 16, wherein said third element comprises a writing head that forms a track on a hard disk.

* * * * *